United States Patent
Conway (10) Patent No.: US 9,331,888 B1
(45) Date of Patent: May 3, 2016

(54) METHODS AND SYSTEMS FOR BRIDGING COMMUNICATIONS BETWEEN AN IP NETWORK AND A VOICE COMMUNICATION SERVICE AT A SUBSCRIBER PREMISES

(75) Inventor: Adrian E. Conway, Weston, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1470 days.

(21) Appl. No.: 11/287,245

(22) Filed: Nov. 28, 2005

(51) Int. Cl.
*H04L 29/06* (2006.01)

(52) U.S. Cl.
CPC ...... *H04L 29/06027* (2013.01); *H04L 65/1069* (2013.01)

(58) Field of Classification Search
CPC ............ H04L 29/06027; H04L 65/1069; H04L 65/4007
See application file for complete search history.

(56) References Cited

U.S. PATENT DOCUMENTS

| | | | |
|---|---|---|---|
| 6,337,858 B1 | 1/2002 | Petty et al. | |
| 6,636,504 B1 * | 10/2003 | Albers et al. | 370/352 |
| 6,693,893 B1 | 2/2004 | Ehlinger | |
| 2002/0052915 A1 * | 5/2002 | Amin-Salehi | 709/203 |
| 2002/0150091 A1 * | 10/2002 | Lopponen et al. | 370/389 |
| 2004/0114581 A1 * | 6/2004 | Hans et al. | 370/356 |
| 2006/0007915 A1 * | 1/2006 | Frame | 370/352 |
| 2007/0120705 A1 * | 5/2007 | Kiiskila et al. | 340/870.02 |

OTHER PUBLICATIONS

Article entitled IP-PSTN documentation page, http://www.ics.agh.edu.pl/Meccano/software/ippstn/ dated Oct. 25, 2005 (5 pages).
Download Page: SIP Residential Gateway, Residential Gateway, http://www.vovida.org/applications/downloads/siprg, downloaded Jun. 19, 2006, 2 pages.
VPC1000 FXS to FXO Port Converter Connect Your Gateway to a Local Telephone Line Instead of a Regular Telephone, PCPhoneline.com, http://www.pcphoneline.com/pcphoneline/fxsfxo.htm, downloaded Jul. 11, 2006, 2 pages.

* cited by examiner

*Primary Examiner* — Luat Phung (57) ABSTRACT

In one of many possible embodiments, a system includes a gateway located at a subscriber premises. The gateway is configured to bridge, at the subscriber premises, a voice communication between an Internet Protocol ("IP") network and a voice communication service available at the subscriber premises. In certain embodiments, the gateway is configured to bridge the voice communication from the IP network to at least one of a Public-Switched Telephone Network ("PSTN") service, a Voice over Internet Protocol ("VoIP") service, and a video phone service at the subscriber premises. In certain embodiments, a registration server communicatively coupled to the gateway by the IP network is configured to maintain registration information associated with the gateway.

31 Claims, 6 Drawing Sheets

METHODS AND SYSTEMS FOR BRIDGING COMMUNICATIONS BETWEEN AN IP NETWORK AND A VOICE COMMUNICATION SERVICE AT A SUBSCRIBER PREMISES

BACKGROUND INFORMATION

For years, reliable voice communication services have been provided over circuit-switched networks such as the public switched telephone network ("PSTN"). More recently, packet-switched networks (e.g., the Internet) capable of carrying data and voice communications have been developed. Such networks allow Internet Protocol ("IP") enabled devices to send and receive IP-based voice communications between one another over packet-switched networks such as the Internet. Initially, however, IP-based voice communications could only be sent and received by IP-enabled devices connected to the Internet. In other words, a person using a computer to initiate a voice communication over the Internet could send the voice communication only to another computer connected to the Internet. The person did not have any way of sending the voice communication to a PSTN telephone number.

Consequently, Voice over Internet Protocol ("VoIP") services capable of connecting IP-based voice communications to the PSTN were introduced. In order to bridge voice communications between the Internet and the PSTN, providers of VoIP services deployed gateways at Internet points of presence ("PoPs") and PSTN central offices (COs) where access to both the Internet and the PSTN were available. With such gateways in place, VoIP services could connect IP-based voice calls from the Internet to the PSTN and vice versa. This allowed VoIP subscribers to communicate with persons who subscribed only to PSTN telephone numbers.

Because conventional IP-PSTN gateways are located at PoPs and COs, the switching between packet-switched networks and circuit-switched networks is transparent to VoIP subscribers, who generally do not know whether their voice calls are being transmitted solely over the Internet or over a combination of the PSTN and the Internet. However, costs of switching voice calls between a packet-switched network and a circuit-switched network (e.g., from the Internet to the PSTN and vice versa) are generally passed on to subscribers as part of subscription fees.

Similarly, many Plain Old Telephone Service ("POTS") providers (e.g., telephone carriers) utilize both circuit-switched networks and packet-switched networks to reduce costs. For example, many POTS providers deploy IP-PSTN gateways at certain central offices ("COs"). The gateways allow voice communications to be transmitted between COs using either circuit-switched networks or packet-switched networks. The use of packet-switched networks to carry voice calls between COs can reduce the costs of POTS, especially when the packet-switched networks are used to carry voice calls over long distances.

While existing voice communication services, including POTS and VoIP services, provide many benefits to subscribers, there remains room for improvement. With respect to POTS provided over the PSTN, for example, a subscriber must generally be at or near the subscriber premises in order to initiate a POTS voice call using a PSTN telephone service available at the subscriber premises. Accordingly, the subscriber is typically unable to utilize her POTS (e.g., her home telephone number) from remote locations. For example, if a POTS subscriber is away from home on a business trip and wishes to place a voice call to a neighbor, the subscriber may have to place and pay for a long distance voice call because she is unable to utilize her home telephone service from a remote location.

On the other hand, VoIP services can be accessed remotely (e.g., over the Internet), but only if a subscriber has access to specialized equipment and/or software. There are currently three main ways to access VoIP services. In one configuration, a user is able to use a standard POTS telephone connected to an analog telephone adaptor ("ATA") to initiate and receive VoIP voice calls. An ATA interfaces a POTS telephone with a VoIP service. The POTS telephone generally plugs directly into the ATA rather than to the PSTN such that the VoIP service can be accessed using the POTS telephone. Accordingly, a subscriber to a VoIP telephone service does not need to subscribe to a PSTN telephone service. In a second configuration, a user can use a specialized Internet Protocol enabled telephone ("IP phone") to access VoIP services. In a third configuration, a user can install and operate software known as a "softphone" on a computer or other computing device. A computing device having softphone software, a microphone, a speaker, a sound card, and an Internet connection is capable of sending and receiving voice communications over the Internet. Unfortunately, in order for a VoIP subscriber to access VoIP services from a remote location, the subscriber generally must have a provider-specific ATA, IP phone, or softphone with her.

Thus, it is desirable to provide improved access and flexibility for using POTS and VoIP services that are available at subscriber premises, especially from remote locations. It is also desirable to limit the fees subscribers pay to access and use voice communication services. In addition, it is desirable to provide capability for bridging, at a subscriber premises, voice communications between an IP network and voice communication services available at the subscriber premises while minimizing subscription fees. It is also desirable to provide subscribers with functionality for sharing voice communication services at subscriber premises (e.g., a PSTN line or VoIP service) with others (e.g., other subscribers or members of a user group).

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Overview

Preferred embodiments according to the present invention may be implemented as systems and methods for bridging, at a subscriber premises, communications between an IP network (e.g., the Internet) and a voice communication service (e.g., PSTN and VoIP services such as PSTN telephone lines and VoIP telephone lines, respectively) available at the subscriber premises. The subscriber premises may include a gateway (e.g., an IP-PSTN gateway) configured to bridge communications between the IP network and one or more voice communication services available at the subscriber premises.

In certain embodiments, for example, the gateway at the subscriber premises may be configured to bridge communications between the IP network and the PSTN. The gateway may receive IP-based communications (e.g., VoIP communications) over the IP network, generate PSTN signals from the IP-based communications, and emulate PSTN functionality to transmit the PSTN signals over the PSTN, including using a PSTN service (e.g., a PSTN telephone line) available at the subscriber premises to transmit the PSTN signals over the PSTN. This allows a user having an IP-enabled device and access to the IP network to access the subscriber premises over the IP network and to bridge IP-based communications to the PSTN at the subscriber premises. Accordingly, a subscriber can remotely access her PSTN line(s) at the subscriber premises. By way of an example, a subscriber having a softphone on an IP device may remotely access a gateway at the subscriber premises via the IP network to bridge a voice call from the IP network to the PSTN, without subscribing to a VoIP service provider.

In certain embodiments, the subscriber may remotely access, through the IP network, a gateway at the subscriber premises to place a VoIP call from the subscriber premises using a VoIP service available at the subscriber premises. This allows the subscriber to remotely access a VoIP service at the subscriber premises without having to have physical access to an analog telephone adapter ("ATA"), IP phone, or softphone that is specific to the provider of the VoIP service at the subscriber premises. Accordingly, the subscriber is able to avoid purchasing or carrying a vendor-specific ATA, IP telephone, or softphone when traveling. This feature is especially economical and practical for subscribers who subscribe to multiple VoIP services provided by different vendors.

In some embodiments, the subscriber at a remote location may select whether to place a VoIP call, a PSTN call, or some other type of voice service call (e.g., a video telephone call) from the subscriber premises. In other embodiments, the gateway at the subscriber premises may be configured to select, based on predefined criteria, whether to bridge a communication from an IP network to a VoIP service, a PSTN service, or another voice communication service available at the subscriber premises.

The gateway at the subscriber premises may be configured to bridge communications in the reverse direction. That is, the gateway may receive voice signals from a voice communication service (e.g., a PSTN service or a VoIP service), optionally generate IP-based communications from the voice communication service signals, and forward the IP-based communications to an IP device over the IP network.

The gateway may be configured to bridge voice communications between different voice communication services available at the subscriber premises. For example, the gateway at the subscriber premises may be configured to bridge a PSTN call to a VoIP service at the subscriber premises. In certain embodiments, for example, the gateway may receive a telephone call over the PSTN and emulate a PSTN device to forward the telephone call to a VoIP ATA located at the subscriber premises. The VoIP ATA can convert and transmit the call over a VoIP service network as a VoIP call. Accordingly, a subscriber to a VoIP service is able to access and use, through the PSTN, a VoIP service provided at the subscriber premises.

The gateway at the subscriber premises may be configured to function as an access point to an IP network (e.g., the Internet) access service available at the subscriber premises. For example, a user at a remote location may place a PSTN call (e.g., a data call initiated by a modem) to the gateway at the subscriber premises over the PSTN. The gateway may answer the call to establish a dial-up data connection. The gateway may then bridge the data connection to an IP access service available at the subscriber premises. Accordingly, a user at a remote location may establish a dial-up connection to an IP network access service (e.g., a broadband connection) at the subscriber premises through the gateway. This allows the user to access the IP network access service from remote locations. Certain VoIP services and configurations capable of supporting data communications may also be used to establish a dial-up connection to the gateway at the subscriber premises.

With gateways (e.g., IP-PSTN gateways) implemented at subscriber premises, users are able to share voice services that are available at the subscriber premises. For example, a first user may use the present systems and methods to remotely access, through an IP network, a gateway at a subscriber premises associated with a second user. The gateway may then bridge IP-based communications to a PSTN service, VoIP service, or other voice communication service at the subscriber premises. In this manner, the first user can avoid making a long distance PSTN voice call by bridging IP-based communications to the PSTN or to a VoIP service at subscriber premises. Users may access a registration server on the IP network to identify subscriber premises having shared and available voice communication services such as a PSTN or VoIP service. Users may form user groups for sharing voice communication services. The registration server may track information associated with user groups and subscriber premises.

These and other benefits provided by the present systems and methods provide users with significant flexibility for accessing and using PSTN services (e.g., PSTN telephone lines), IP network access services (e.g., broadband Internet connections), VoIP services (e.g., VoIP telephone lines), and other voice communication services at subscriber premises, including accessing and using the services from remote locations. The present systems and methods provide users with increased flexibility for managing costs associated with voice communication services and IP network access services.

II. Exemplary System

Figure 1:
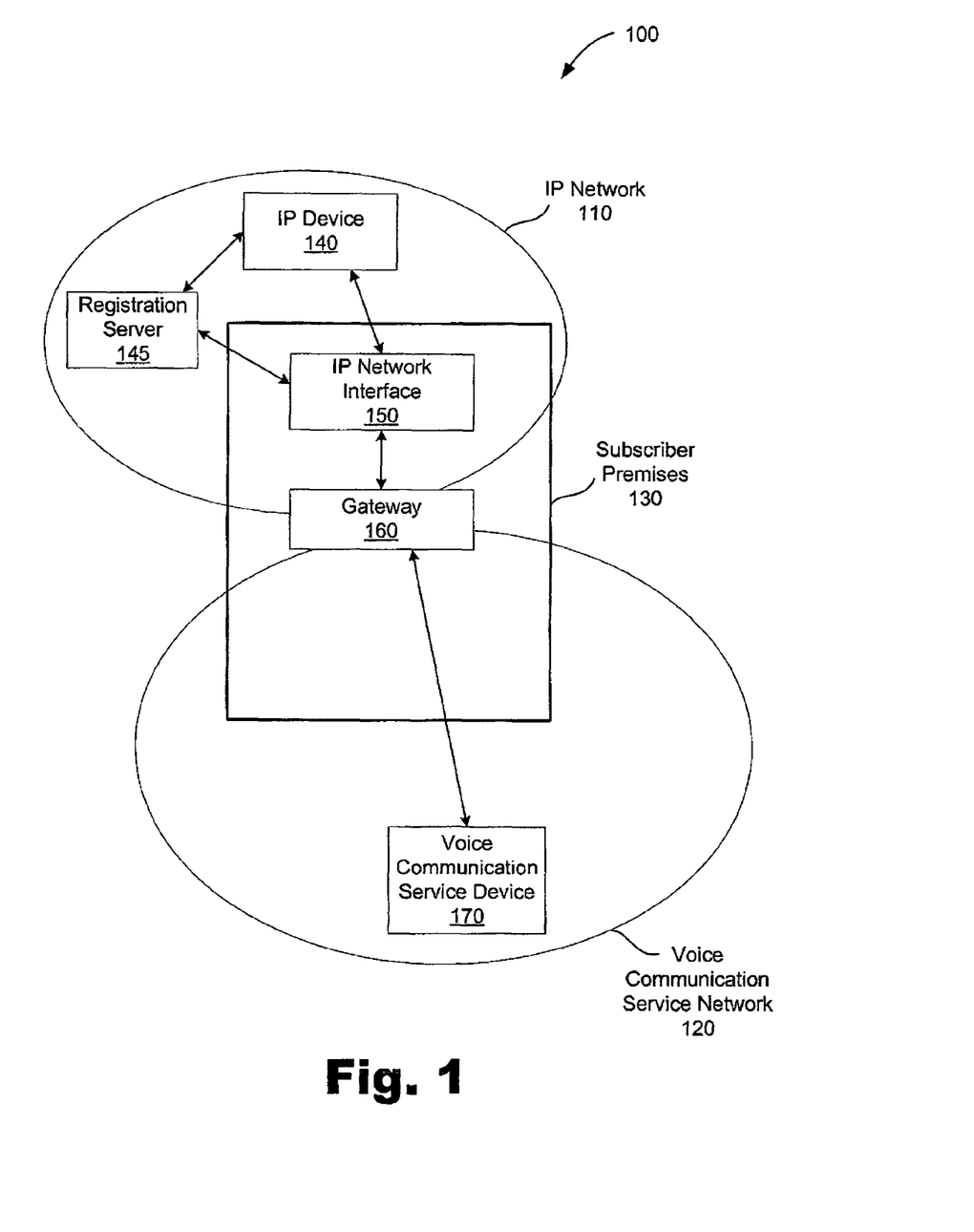
FIG. 1 is a block diagram illustrating an exemplary system for bridging communications between an IP network and one or more voice communication services available at a subscriber premises, according to an embodiment.

Turning now to the figures, FIG. 1 is a block diagram of an exemplary system 100 for bridging communications between IP network 110 and one or more voice communication services (e.g., a voice communication service available over a voice communication service network 120) available at subscriber premises 130, according to one embodiment. As shown in FIG. 1, IP network 110 includes IP device 140 and registration server 145 in communication with one another and in communication with IP network interface 150, which is part of subscriber premises 130. Subscriber premises 130 further includes gateway 160, which is configured to bridge, at subscriber premises 130, communications between IP network 110 and one or more voice communication services available at subscriber premises 130. For example, gateway 160 may be configured to bridge an IP-based communication received over IP network 110 by communicating with IP network interface 150 to receive IP-based voice communications and emulating voice communication service functionality (e.g., PSTN functionality) to communicate with voice communication service device 170, or other voice communication service devices, over the voice communication service network 120. This allows a user of IP device 140 to go through IP network 110 to access, by way of a voice communication service available at subscriber premises 130, the voice communication service network 120. In certain embodiments, for example, the user may utilize IP device 140 to access subscriber premises 130, even from remote locations, and use a voice communication service (e.g., a PSTN telephone line) associated with subscriber premises 130 to place a voice call over the voice communication service network 120. Gateway 160 may be configured to bridge IP-based voice communications with one or more voice communications services available at subscriber premises 130, including VoIP services, PSTN services, voice/video services (i.e., video call services), multimedia services, and other voice communication services.

While an exemplary system 100 is shown in FIG. 1, those skilled in the art will recognize that the exemplary components illustrated in the Figure are not intended to be limiting. Indeed, those skilled in the art will recognize that other alternative hardware environments and implementations may be used. For example, one or more voice communication service networks and services may be available at subscriber premises 130. Each of the elements shown in FIG. 1 will now be described in detail.

A. IP Network

IP network 110 may include one or more devices (e.g., IP device 140 and registration server 145) in communication with one another and in communication with IP network interface 150. Devices of IP network 110 may be configured to send and receive IP-based data packets between one another and to/from IP network interface 150 over suitable transmission media and protocol(s). IP network 110 may include one or more packet-switched networks, including, but not limited to, any IP-based networks, local area networks, wide area networks, metropolitan area networks, proprietary data networks, wireless communication networks (e.g., Wi-Fi area networks), pico-networks (e.g., Bluetooth® networks), Ethernet-based networks, intranets, and the Internet. It is anticipated that IP network 110 may include any packet-switched network(s) capable of carrying data (e.g., voice data) between devices.

In some embodiments, IP network 110 may include gateways (not shown) upstream from subscriber premises 130 for bridging communications between IP network 110 and circuit-switched networks such as the PSTN. For example, IP network 110 may include gateways at points of presence ("POPs") having interfaces to the PSTN, as will be understood by those skilled in the art. However, upstream gateways do not provide the same level of accessibility, user control, flexibility, and other benefits provided by gateways 160 located at subscriber premises 130.

As shown in FIG. 1, IP network 110 may extend beyond subscriber premises 130. In alternative embodiments, however, it is anticipated that IP network 110 may include one or more networks that are exclusively within subscriber premises 130. For example, IP network 110 may include a local area network ("LAN") within a home or business. Alternatively, IP network 110 may include at least one IP-based network (e.g., the Internet) that extends beyond subscriber premises 130 and at least one IP-based network (e.g., a LAN) that is employed exclusively within subscriber premises 130.

1. IP Device

IP device 140 may include any device or devices physically accessible to a user or that otherwise allow a user to provide input to, receive information from, access, or otherwise communicate with registration server 145 and IP network interface 150 over IP network 110. IP device 140 may include, but is not limited to, one or more desktop computers, laptop computers, tablet computers, handheld devices, personal data assistants, mobile telephones (e.g. cellular telephones), IP-enabled devices (e.g., IP telephones), session initiation protocol ("SIP") enabled devices (e.g., SIP telephones), mobile IP telephones, mobile SIP telephones, satellite pagers, wireless internet devices, embedded computers, video phones, mainframe computers, mini-computers, workstations, network interface cards, programmable logic devices, entertainment devices, gaming devices, computing devices operating softphones, and any other device capable of communicating with registration server 145 and IP network interface 150 over IP network 110. IP device 140 may include various peripherals such as a terminal, keyboard, mouse, screen, printer, stylus, input device, output device, microphone, speaker, sound card, or any other apparatus or interface that can help relay information between a user and registration server 145 and/or IP network interface 150.

2. Registration Server

Registration server 145 may include any device or devices (e.g., one or more servers) capable of communicating with IP device 140 and IP network interface 150 over IP network 110 using any suitable transmission media and protocol(s). In certain embodiments, registration server 145, IP device 140, and IP network interface 150 are configured to communicate with one another using session initiation protocol ("SIP"). In many embodiments, registration server 145 is assigned one or more network addresses (e.g., IP addresses) so that IP device 140 and IP network device 150 may initiate communications with registration server 145. Registration server 145 may be backed up by one or more redundant registration servers.

Registration server 145 may be configured to maintain registration information for devices registered on IP network 110. For example, registration server 145 may maintain registration information for IP network interface 150, gateway 160, or both gateway 160 and IP network interface 150. Registration information may include, but is not limited to, network addresses (e.g., IP addresses or IP addresses and port numbers), network address translation ("NAT") information, area codes, country codes, availability or unavailability schedules for PSTN lines, and device status information (e.g., status information associated with gateway 160 and/or IP network interface 150). Status information may include, but is not limited to, information indicative of whether gateway 160 is currently in use (e.g., gateway 160 is busy bridging communications between IP network 110 and voice communication service network 120), unavailable, available, connected to IP network 110, or not connected to IP network 110. Status information may also include information indicative of whether a voice communications service or an interface between subscriber premises 130 and the voice communication service is currently in use. For example, status information may indicate that a PSTN or a VoIP telephone line associated with subscriber premises 130 is in use.

Registration server 145 may be configured to receive registration information from IP network interface 150 over IP network 110. For example, when gateway 160 changes status (e.g., registration status), gateway 160 is configured to provide updated information (e.g., updated registration information) to registration server 145 through IP network interface 150. Gateway 160 may be configured to notify registration server 145 of any status change, including, but not limited to, turning power on or off, connecting or disconnecting to/from IP network 110, initiating or terminating use of voice communications services, and any other event that causes a change in status of gateway 160, a voice communications service, or an interface (e.g., a telephone line) between subscriber premises 130 and voice communication service network 120. Gateway 160 may go through IP network interface 150 to send notifications to registration server 145.

By maintaining up-to-date registration information, registration server 145 can be accessed by IP device 140 to determine information (e.g., current network address) associated with IP network interface 150 and/or gateway 160. This is especially useful when network addresses (e.g., IP addresses or IP addresses and port addresses) for IP network interface 150 and/or gateway 160 are dynamically assigned, as will be understood by those skilled in the art.

IP device 140 may query registration server 145 for registration information, including registration information associated with IP network interface 150 and/or gateway 160. Registration server 145 may be configured to respond to the query by providing registration information to IP device 140. For example, registration server 145 may respond to the query by providing a current IP address assigned to IP network interface 150 and, optionally, a port number assigned to gateway 160. Registration server 145 may also provide other registration information, including network address translation information and/or status information for gateway 160, to IP device 140 in response to the query.

Having received registration information for gateway 160 from registration server 145, IP device 140 may connect to gateway 160 via IP network interface 150. Once connected, IP device 140 may send signals over IP network 110 instructing gateway 160 to bridge an IP-based communication (e.g., a VoIP communication) to a voice communication service available at subscriber premises 130, including, for example, bridging an IP-based communication to voice communication service network 120 as a voice service communication (e.g., a POTS telephone call). Exemplary functions of gateway 160 will be described in detail further below.

Registration server 145 may maintain other types of information. For example, registration server 145 may maintain information associated with user groups, including security information, authentication information (e.g., usernames and passwords), conflict policies (e.g., actions to take when voice communication services at subscriber premises 130 are conflicting), subscriber premises information (e.g. physical addresses or telephone area codes); and any other information potentially useful to users for accessing subscriber premises (e.g., subscriber premises 130). Accordingly, members of user groups may access registration server 145 to identify subscriber premises at useful locations that are available to bridge IP-based communications to voice communication services available at the subscriber premises. An exemplary user group implementation of system 100 will be described below in reference to FIG. 4.

Registration server 145 may maintain additional types of information, including billing and usage information for voice communication services, for example. Billing and usage information may be tied to members of user groups. In certain embodiments, for example, users may be charged access fees for using a voice communication service associated with another subscriber. Billing and usage information may be tied to subscribers associated with subscriber premises. For example, subscribers may be awarded micro-rebates from voice service providers (e.g., POTS carriers) based on shared usage of voice communication services.

B. Voice Communication Service Network

Voice communication service network 120 may include devices (e.g., voice communication service device 170) capable of communicating circuit-switched and/or packet-switched voice signals with one another over suitable transmission media (e.g., PSTN circuits and/or VoIP channels). Voice communication service network 120 may include one or more circuit-switched networks, including the PSTN and other landline and/or wireless telephone networks (e.g., cellular networks). Voice communication service network 120 may include one or more networks capable of carrying VoIP or other forms of packetized voice signals. Typically, voice communication network 120 includes one or more networks associated with voice communication services.

As will be understood by those skilled in the art, voice communication service network 120 may include or interface with other networks capable of carrying voice signals, including other packet-switched networks, circuit-switched networks, or any suitable combination of packet-switched and circuit-switched networks. For example, voice communication service network 120 may include gateways (not shown) located upstream from subscriber premises 130 for bridging communications between voice communication service network 120 and other communication networks, including packet-switched networks such as the Internet, as will be understood by those skilled in the art. Again, upstream gateways do not provide the accessibility, user control, flexibility, and other benefits provided by gateways 160 located at subscriber premises 130.

Voice communication service network 120 may extend into subscriber premises 130. For example, voice communication service network 120 may include PSTN services (e.g., PSTN telephone lines and corresponding telephone numbers), VoIP services (e.g., VoIP telephone lines and corresponding telephone numbers), voice/video services, multimedia service, and other voice communication services made available to subscribers at subscriber premises 130, as will be understood by those skilled in the art.

1. Voice Communication Service Device

Voice communication service device 170 may include any device or devices capable of sending and/or receiving voice communications over voice communication service network 120. Voice communication service device 170 may include, but is not limited to, one or more voice-enabled personal data assistants, mobile telephones (cellular telephones), satellite pagers, video phones, Plain Old Telephone Service ("POTS") devices (e.g., POTS telephones), PSTN devices (e.g., switches), VoIP devices, video-enabled voice communication devices, and any other devices capable of communicating over voice communication service network 120. Voice communication service device 170 may include any devices known to be implemented in the PSTN or VoIP networks.

C. Subscriber Premises

Subscriber premises 130 may include one or more physical structures (e.g., a residential or business building) having access to one or more services (e.g., PSTN, Internet access, and/or VoIP services) provided over IP network 110 and/or voice communication service network 120. In certain embodiments, for example, subscriber premises 130 includes a home or a business structure associated with a subscriber to (i.e., an end user of) services provided over IP network 110 and/or voice communication service network 120. The subscriber may be an individual, a business, or other entity. In many embodiments, subscriber premises 130 includes at least one endpoint of services provided over voice communication service network 120 and IP network 110. For example, subscriber premises 130 may include one or more endpoints of PSTN services (e.g., PSTN telephone lines), VoIP services (e.g., VoIP telephone lines), and/or voice and data broadband services. Gateway 160 is able to use the service endpoints to bridge voice communications between IP network 110 and voice communication service network 120 at subscriber premises 130, as described below.

Subscriber premises 130 can include any device or combination of devices useful for communicating over IP network 110 and/or voice communication service network 120, including any devices for communicating with IP device 140, registration server 145, and voice communication service device 170. In particular, subscriber premises 130 may include IP network interface 150 configured to communicate over IP network 110, including communicating with both IP device 140 and registration server 145. Subscriber premises may also include gateway 160 configured to communicate with IP network interface 150 and voice communication service device 170. In alternative embodiments, subscriber premises 130 may include an interface (e.g., an optical network terminal) configured to send and receive communications externally over voice communication service network 120, or to filter communications received and to be sent externally over voice communication service network 120. Exemplary embodiments of subscriber premises 130 will be described below in reference to FIGS. 2 and 3.

1. IP Network Interface

IP network interface 150 may include any device or devices helpful for communicating with IP device 140 and registration server 145 over IP network 110. For example, IP network interface 150 may include, but is not limited to, one or more modems (e.g., DSL or cable modems), optical network terminals ("ONTs"), routers, wireless access points, Ethernet interfaces, network interface cards, and any known device useful for communicating over IP network 110.

IP network interface 150 may be configured to interface gateway 160 with both registration server 145 and IP device 140. Accordingly, IP network interface 150 may be configured to receive communications from IP device 140 and registration server 145 and to process and forward the communications to gateway 160. IP network interface 150 may also be configured to receive communications from gateway 160 and to process and forward the communications to IP device 140 or registration server 145.

While FIG. 1 shows gateway 160 communicating directly with voice communication service device 170, this is not intended to be limiting. In certain embodiments, IP network interface 150 may be configured to act as an interface for communications between gateway 160 and voice communication service device 170. For example, IP network interface 150 may include a "broadband" interface (e.g., a DSL, cable, wireless, or fiber optic connection) to both IP network 110 and voice communication service network 120. Examples of DSL broadband and fiber optic broadband interfaces will be described below with reference to FIGS. 2 and 3.

2. Gateway

Gateway 160 may be configured to bridge communications between IP network 110 and a voice communication service available over voice communication service network 120 at subscriber premises 130. For example, gateway 160 may be configured to receive communications from IP network interface 150 and to emulate voice communication service functionality in order to translate and forward the communications to voice communication service device 170. Gateway 160 may also work in the reverse, i.e. it may emulate voice communication service functionality to receive communications from voice communication service device 170 (e.g., answer an incoming PSTN telephone call). Gateway 160 may translate and forward the communications to IP network interface 150.

Gateway 160 may employ any known technologies potentially useful for bridging communications from IP network 110 to voice communication service network 120 and vice versa, including known technologies for translating IP-based signals to/from voice communication service signals (e.g., PSTN and VoIP signals). For example, gateway 160 may include one or more IP-PSTN gateways configured for implementation at subscriber premises 130 and configured with conversion technologies known to those skilled in the art, including technologies for converting IP-based signals to voice communication service signals (e.g., PSTN signals). Gateway 160 may include, for example, a POTS modem configured to communicate using POTS signaling as an interface to the voice communication service (e.g., the PSTN), a network interface device (e.g., Ethernet NIC) as an interface to the IP network 110 (via IP network interface 150), and control logic configured to perform the necessary receptions, translations and transmissions between each, and related control features. Gateway 160 may be configured to recognize termination of the use of a voice communication service (e.g., a PSTN call) and disconnect from voice communication service network 120 (e.g., the PSTN) upon recognition of the termination of the use of the voice communication service.

In addition, gateway 160 is configured for deployment at subscriber premises 130 (e.g., by minimizing size and complexity), as opposed to known gateways configured to operate at upstream points of presence or central offices of IP networks and the PSTN, respectively. The subscriber premises location of gateway 160 provides significant flexibility to users for maximizing access, control, and use of voice communication services made available at subscriber premises. In particular, a user is able to use IP network 110 to access and utilize one or more voice communication services (e.g., a PSTN and/or VoIP telephone line) available at subscriber premises 130. Accordingly, the user can initiate voice service communications (e.g., PSTN voice calls and/or VoIP voice calls) from subscriber premises 130 by accessing subscriber premises 130 through IP network 110. This allows users to bridge communications from IP network 110 to voice communication service network 120 without having to rely on upstream gateways provided by VoIP or POTS service providers. Consequently, users can bridge communications to voice communication service network 120 while avoiding certain subscription fees (e.g., VoIP subscription fees) and while minimizing reliance on vendor-specific equipment or software.

Because gateway 160 is located at subscriber premises 130, users also have significant control over access to their voice communication services. For example, a user may set customized security for gateway 160 to satisfy the preferences of the user. Access may be granted only to the particular user, to users having an appropriate password, or to a predefined set of users.

As discussed above, gateway 160 may be configured to update registration server 145 with registration information. Accordingly, IP devices (e.g., IP device 140) are able to query registration server 145 for information useful for accessing gateway 160. IP network interface 150 and gateway 160 may be dynamically assigned network addresses (e.g., IP addresses and optionally port numbers), and the registration server 145 will maintain the current network addresses, including IP addresses and port numbers, for example, at which the gateway 160 and/or IP network interface 150 are accessible over IP network 110.

In alternative embodiments, gateway 160 and/or IP network interface 150 may be assigned permanent network addresses. In these embodiments, IP device 140 may access gateway 160 and/or IP network interface 150 without first querying registration server 145.

As mentioned above, gateway 160 may also be configured to receive communications from a voice communication service (e.g., voice calls or data communications over voice communication service network 120) and to bridge the communications to IP network 110. For example, voice communication service device 170 may initiate a voice call to a voice communication service (e.g., a PSTN telephone line) associated with subscriber premises 130, and gateway 160 may answer the voice call. Gateway 160 can bridge the voice call from voice communication service network 120 to IP network 110. The bridged voice call may be forwarded over IP network 110, including, for example, to IP device 140. Gateway 160 may generate and forward IP-based signals over IP network 110, or gateway 160 may emulate voice communication service functionality to forward the voice call to a VoIP analog telephone adaptor, which may convert the voice call to VoIP signals that can be transmitted over voice communication service network 120 using a VoIP service, as will be understood by those skilled in the art.

In order to determine to where converted IP-based signals should be forwarded on IP network 110, devices registered on IP network 110 (e.g., IP device 140) may be configured to provide registration information to registration server 145 (e.g., periodically or upon a registration or status change event). Accordingly, gateway 160 may query registration server 145 (via IP network interface 150) to determine registration information (e.g., network address) associated with IP device 140 in order to minimize call connection time. The converted IP-based signals may then be forwarded from subscriber premises 130 to IP device 140 over IP network 110.

Gateway 160 may also be configured to function as a remote access server. For example, gateway 160 may be configured to act as a local or personal dial-up access point through which a user may access services provided at subscriber premises 130. In certain embodiments, for example, gateway 160 may include a modem configured to receive and process communications (e.g., data communications) received over a voice communication service, including a PSTN service provided over voice communication service network 120. Gateway 160 can be configured to bridge the received voice service communication to an IP network access service (e.g., an Internet access service) available at subscriber premises 130. Accordingly, a user may place a voice call to a PSTN or VoIP telephone number associated with subscriber premises 130 and establish a modem-to-modem connection with gateway 160. Through this connection, the user can connect to IP network 110 using a service access interface (e.g., a broadband service interface) provided at subscriber premises 130.

Gateway 160 may also include a wireless interface. For example, gateway 160 may include a local area network wireless access point through which a user or users can access gateway 160. Accordingly, a user with a wireless IP device can connect to the wireless interface of gateway 160 and use the connection to establish a voice call over voice communication service network 120 (e.g., a VoIP call over voice communication service network 120 through an ATA) or a VoIP call over IP network 110. Gateway 160 may also be configured to allow other users (e.g., users with access to the wireless local area network or members of a predefined user group) to establish a connection with gateway 160 and to use the connection to initiate voice calls over IP network 110 or over voice communication service network 120.

III. Exemplary Subscriber Premises Components

Figure 2:
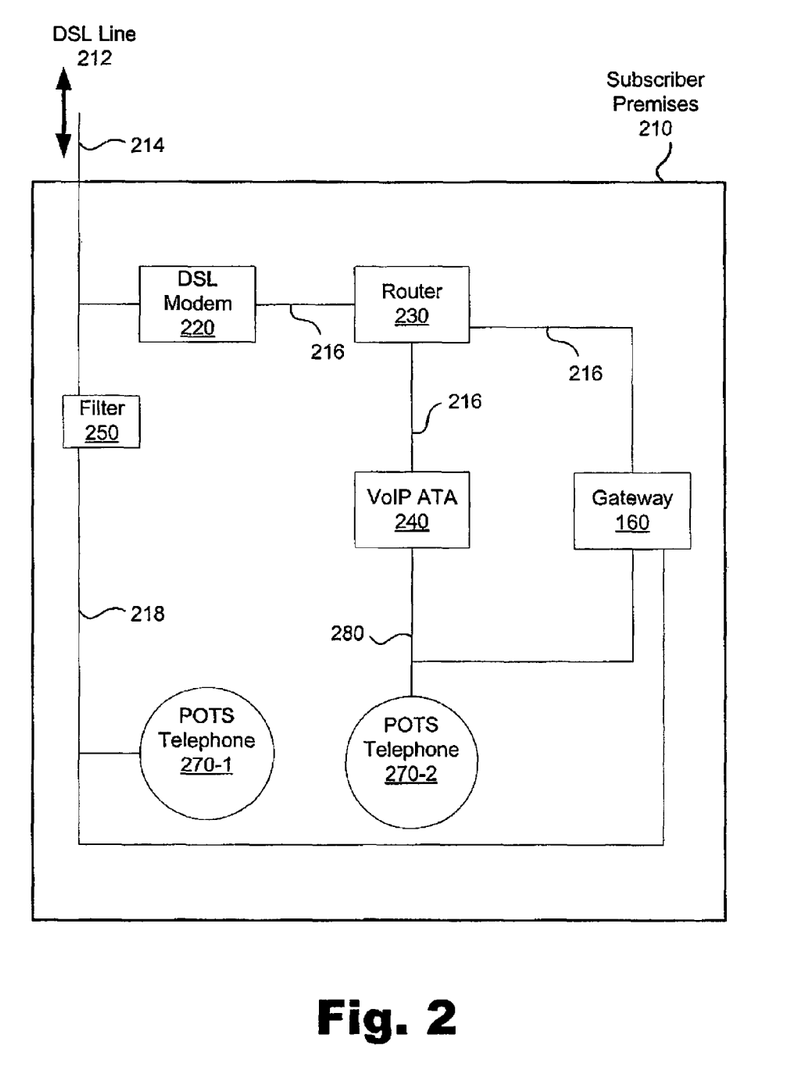
FIG. 2 is a block diagram illustrating exemplary subscriber premises components for bridging communications between the IP network and one or more voice communication services available at a subscriber premises, where the subscriber premises is connected to the IP network and the voice communication service network of FIG. 1 by a digital subscriber line ("DSL") connection, according to an embodiment.

FIG. 2 illustrates a particular embodiment of subscriber premises 130 of FIG. 1, which embodiment is referred to as subscriber premises 210. In particular, FIG. 2 illustrates exemplary components for bridging communications between IP network 110 and one or more voice communication services available at subscriber premises 210, where subscriber premises 210 is connected to IP network 110 and voice communication service network 120 of FIG. 1 by a digital subscriber line ("DSL") line 212, according to an embodiment. DSL broadband services (e.g., voice and data services) may be made available to subscriber premises 210 through any suitable transmission medium or media, including exterior copper wiring 214, for example. IP-based signals (e.g., IP-based voice and/or data signals) associated with the broadband services may be propagated within subscriber premises 210 over any suitable medium or media, including wireless connections and/or Ethernet connections 216. Voice service signals (e.g., PSTN signals) associated with the broadband services may be propagated within subscriber premises 210 using any suitable medium or media, including interior copper wiring 218, for example. In the embodiment of FIG. 2, voice service communication network 120 includes the PSTN, which may extend into subscriber premises 210. Interior copper wiring 218 may represent a segment of the PSTN extending into subscriber premises 210.

Broadband connection interfaces such as DSL line 212 and DSL modem 220 form a coincident or proximate physical location of IP network 110 and voice communication service network 120. The components of subscriber premises 210, and particularly gateway 160, utilize the broadband interface at subscriber premises 210 to bridge communications between IP network 110 and voice communication service network 120.

As shown in FIG. 2, subscriber premises 210 may include DSL modem 220, router 230, VoIP analog telephone adaptor 240 ("VoIP ATA 240") (e.g., a VoiceWing® ATA provided by Verizon Communications Inc. of New York, N.Y.), gateway 160, filter 250, and POTS telephones 270-1 and 270-2 communicatively connected as shown in the Figure. Connection 280 may connect POTS telephone 270-2 and ATA 240 as shown in FIG. 2. Connection 280 may be made using a standard telephone connector and jacks. As will be understood by those skilled in the art, connection 280 may be independent of a voice communication service available over voice communication service network 120 (e.g., the PSTN), which independence allows subscribers to subscribe to a particular voice communication service (e.g., VoIP services) without having to subscribe to other voice communication services (e.g., PSTN services). Accordingly, a subscriber can use ATA 240 and POTS telephone 270-2 to access VoIP services independently of other voice communication services such as those provided over the PSTN.

Gateway 160 may be located behind router 230 with respect to DSL line 212. Accordingly, router 230 may be assigned an externally valid network address (e.g., IP address) for use in communicating over IP network 110 through DSL modem 220. Gateway 160 may be connected to a port of router 230 and assigned an internal address (e.g., a port or other internal network address), and DSL modem 220 and/or router 230 may be configured to perform network address translation ("NAT") functions, which are known to those skilled in the art, as part of interfacing gateway 160 with devices (e.g., IP device 140 and registration server 145) of IP network 110.

The components of subscriber premises 210 are able to bridge communications from IP network 110 to voice communication service network 120 and vice versa, in the same or similar ways as described above. With respect to bridging communications from IP network 110 to voice communication service network 120, incoming IP-based signals may be received from DSL line 212 by DSL modem 220, which forwards the incoming IP-based signals to router 230. Router 230 may forward the incoming IP-based signals to gateway 160, which can convert the IP-based signals to voice communication service signals (e.g., PSTN signals) to bridge the communications onto voice communication service network 120 as described above.

In certain cases, the incoming IP-based signals may include VoIP signals that are forwarded from DSL modem 220 to router 230 and from router 230 to VoIP ATA 240, as will be understood by those skilled in the art. VoIP ATA 240 may translate the VoIP signals into signals that can be received by POTS telephone 270-2, as will be understood by those skilled in the art. As shown in FIG. 2, gateway 160 may be connected to the connection 280 between VoIP ATA 240 and POTS telephone 270-2 (or directly to both VoIP ATA 240 and POTS telephone 270-2 in alternative embodiments), thereby allowing gateway 160 to receive signals output from VoIP ATA 240. Gateway 160 may be configured to interface VoIP ATA 240 with voice communication service network 120. Accordingly, gateway 160 may be configured to emulate voice communication service functionality to forward the signals output by VoIP ATA 240 over voice communication service network 120 (e.g., to voice communication service device 170).

Gateway 160 may be further configured to bridge the incoming IP-based signals to a VoIP service provided at subscriber premises 210. For example, gateway 160 may receive IP-based signals from router 230, convert the IP-based signals to PSTN signals, and emulate PSTN functionality (e.g., emulate POTS telephone 270-2) to communicate the PSTN signals to VoIP ATA 240. VoIP ATA 240 can convert the PSTN signals to VoIP signals as if the PSTN signals been received from POTS telephone 270-2 and forward the VoIP signals to router 230 for transmission over voice communication service network 120, as known to those skilled in the art. This allows a user to remotely access and use a VoIP service at subscriber premises 210, even without having physical access to a vendor-specific ATA, IP phone, or softphone. In some embodiments, a subscriber premises may have access to multiple VoIP services, and gateway 160 may be configured to bridge communications to any of the VoIP services. A subscriber may select from the VoIP services, or gateway 160 may be configured to make a selection based on predefined criteria. Of course, VoIP ATA 240 and VoIP services may be omitted from other embodiments of subscriber premises 210. In other embodiments of subscriber premises 210, one or more VoIP services may be available without any PSTN service being made available.

With respect to bridging communications from voice communication service network 120 to IP network 110, incoming voice communication service signals (e.g., PSTN signals) may be received from DSL line 212, passed through filter 250, and received by gateway 160, which may emulate voice communication service functionality to communicate the received voice communication service signals to VoIP ATA 240. VoIP ATA 240 can convert the voice communication service signals to VoIP signals and forward the VoIP signals to router 230 for transmission over voice communication service network 120, as described above. This allows a user to remotely access and use a VoIP service at subscriber premises 210 through another voice communication service. By way of example, a local telephone call may be placed over the PSTN to subscriber premises 210 to access and use a VoIP service to place a VoIP call from subscriber premises 210, which feature is especially useful for making long distance telephone calls while avoiding or minimizing long distance PSTN fees.

Instead of forwarding incoming voice communication service signals to VoIP ATA 240 via gateway 160, gateway 160 may optionally convert the voice communication service signals to IP-based signals and forward the converted signals to router 230 for transmission over IP network 110 (e.g., to IP device 140). Accordingly, voice service communications can be bridged from voice communication service network to IP network 110 without using a VoIP subscription service. As described above, gateway 160 may query registration server 145 to determine a current network address for IP device 140 or other devices registered on IP network 110.

Gateway 160 may be configured to bridge multimedia communications (e.g., voice and video telephone calls) between IP network 110 and a video communication service available at subscriber premises 210. For example, subscriber premises 210 may be modified to include a video phone ATA in place of or in addition to VoIP ATA 240. A video phone may be connected to the video phone ATA. Accordingly, gateway 160 can use the video phone ATA to bridge communications between IP network 110 and a video communication service available at subscriber premises 210.

Figure 3:
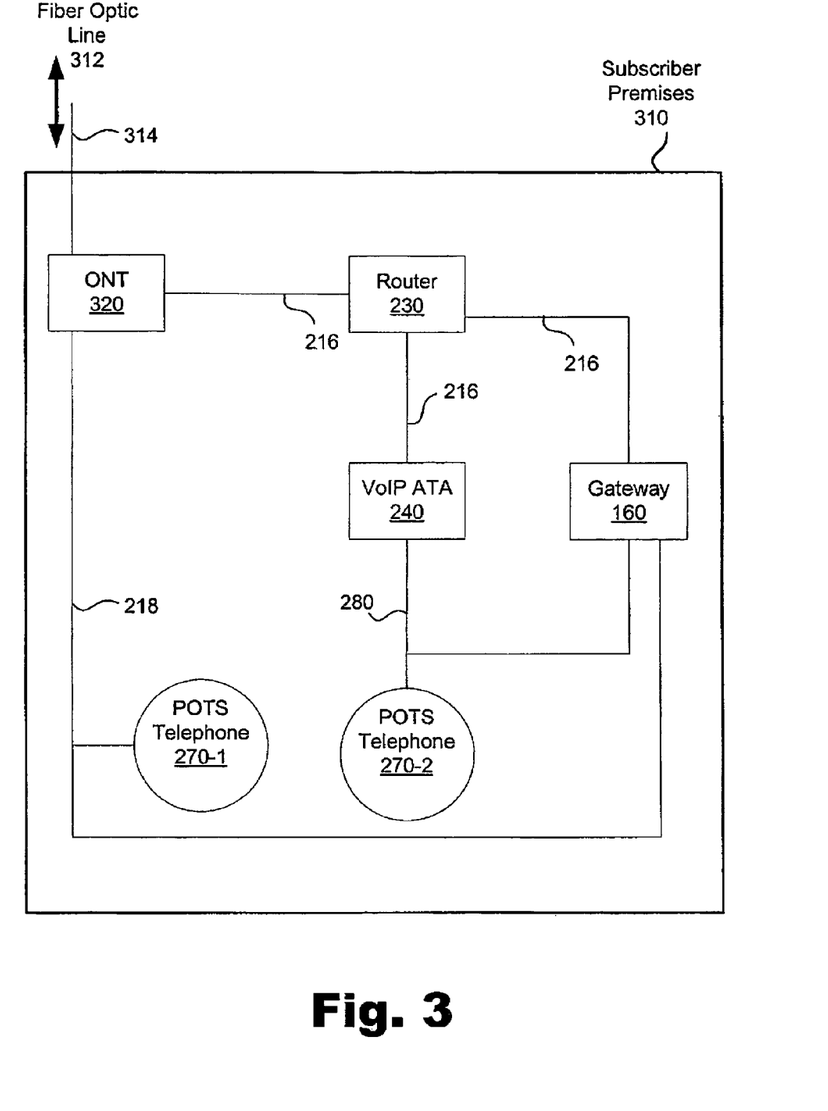
FIG. 3 is a block diagram illustrating other exemplary subscriber premises components for bridging communications between the IP network and one or more voice communication services available at a subscriber premises, where the subscriber premises is connected to the IP network and the voice communication service network of FIG. 1 by a fiber optic connection, according to an embodiment.

FIG. 3 illustrates another particular embodiment of subscriber premises 130 of FIG. 1, which embodiment is referred to as subscriber premises 310. In particular, FIG. 3 illustrates exemplary components for bridging communications between IP network 110 and one or more voice communication services available at subscriber premises 310, where subscriber premises 310 is connected to IP network 110 and voice communication service network 120 of FIG. 1 by a fiber optic line 312 (e.g., a fiber-to-the premises ("FTTP") line (such as a "FiOS" line provided by Verizon Communications Inc. of New York, N.Y.), according to an embodiment. Fiber optic broadband services (e.g., voice and data services) may be made available at subscriber premises 310 through any suitable transmission medium or media, including exterior optical fiber 314, for example. IP-based signals and voice communication service signals associated with the broadband services may be propagated within subscriber premises 310 over any suitable medium or media, including wireless connections, Ethernet connections 216, and/or interior copper wiring 218, for example.

Similarly to the DSL broadband embodiment shown in FIG. 2, fiber optic broadband connection interfaces such as fiber optic line 312 and optical network terminal ("ONT") 320 provide a coincident or proximate physical location of IP network 110 and voice communication service network 120. The components of subscriber premises 310, and particularly gateway 160, utilize the broadband interface at subscriber premises 310 to bridge communications between IP network 110 and voice communication service network 120. Other types of broadband interfaces at subscriber premises may also be used to bridge communications between IP network 110 and voice communication service network 120, including wireless, cable television, or satellite broadband interfaces.

As shown in FIG. 3, subscriber premises 310 may include ONT 320, router 230, VoIP ATA 240, gateway 160, and POTS telephones 270-1 and 270-2 communicatively connected as shown in the Figure. Gateway 160 may be located behind router 230 with respect to fiber optic line 312. Accordingly, router 230 and gateway 160 may function as described above to bridge communications between IP network 110 and one or more voice communications services available at subscriber premises 310.

ONT 320 is configured to function as an interface between fiber optic line 312 and both router 230 and gateway 160. ONT 320 may function in any way known to those skilled in the art to interface the fiber optic line 312 with router 230 and voice communication service devices (e.g., POTS device 270-1), including formatting incoming signals for forwarding to router 230 or voice communication service devices and formatting outgoing signals for transmission over fiber optic line 312. Accordingly, gateway 160 can emulate voice communication service functionality to communicate with ONT 320.

While FIGS. 2 and 3 illustrate exemplary embodiments in which subscriber premises are connected to IP network 110 and voice communication service network 120 by a DSL broadband connection and a fiber optic broadband connection, respectively, this is not limiting. Other embodiments may utilize other types of connections to IP network 110 and voice communication service network 120. For example, other broadband services may be used, including, but not limited to, broadband wireless services, cable television broadband services, and satellite broadband services. Alternatively, separate connections or services may be used to connect to IP network 110 and voice communication service network 120 at subscriber premises 130. For example, a connection to IP network 110 may be by dial-up connection (e.g., using a second telephone line at subscriber premises 130), wireless access point, Ethernet connection, modem connection, satellite service, cable television service, DSL service, fiber optic service, other broadband service, or any other suitable or known connection to IP networks. Connection to voice communication service network 120 may be by exterior copper wiring, voice communication carrier service, standard PSTN telephone line, VoIP telephone line, satellite service, cable television service, DSL service, fiber optic service, other broadband service, and any other suitable or known connection to voice communication service network 120, which may comprise the PSTN. Any combination of the above-listed IP network and voice communication service network connections may be used to connect subscriber premises 130 to IP network 110 and one or more voice communication services, including VoIP services and PSTN services.

In addition, while FIGS. 2 and 3 illustrate exemplary embodiments of subscriber premises 130, other embodiments may include other configurations of hardware components. For example, modems, routers, ATAs, and gateways at subscriber premises 130 may be configured as one or more devices. In some embodiments, for example, any combination of gateway 160, DSL modem 220, ONT 320, router 230, and VoIP ATA 240 may be implemented in a single device. In certain embodiments, gateway 160 may be implemented as computer-readable instructions (e.g., software) on one or more computing devices (e.g., personal computer) located at subscriber premises 130.

IV. Exemplary User Group Implementation

Figure 4:
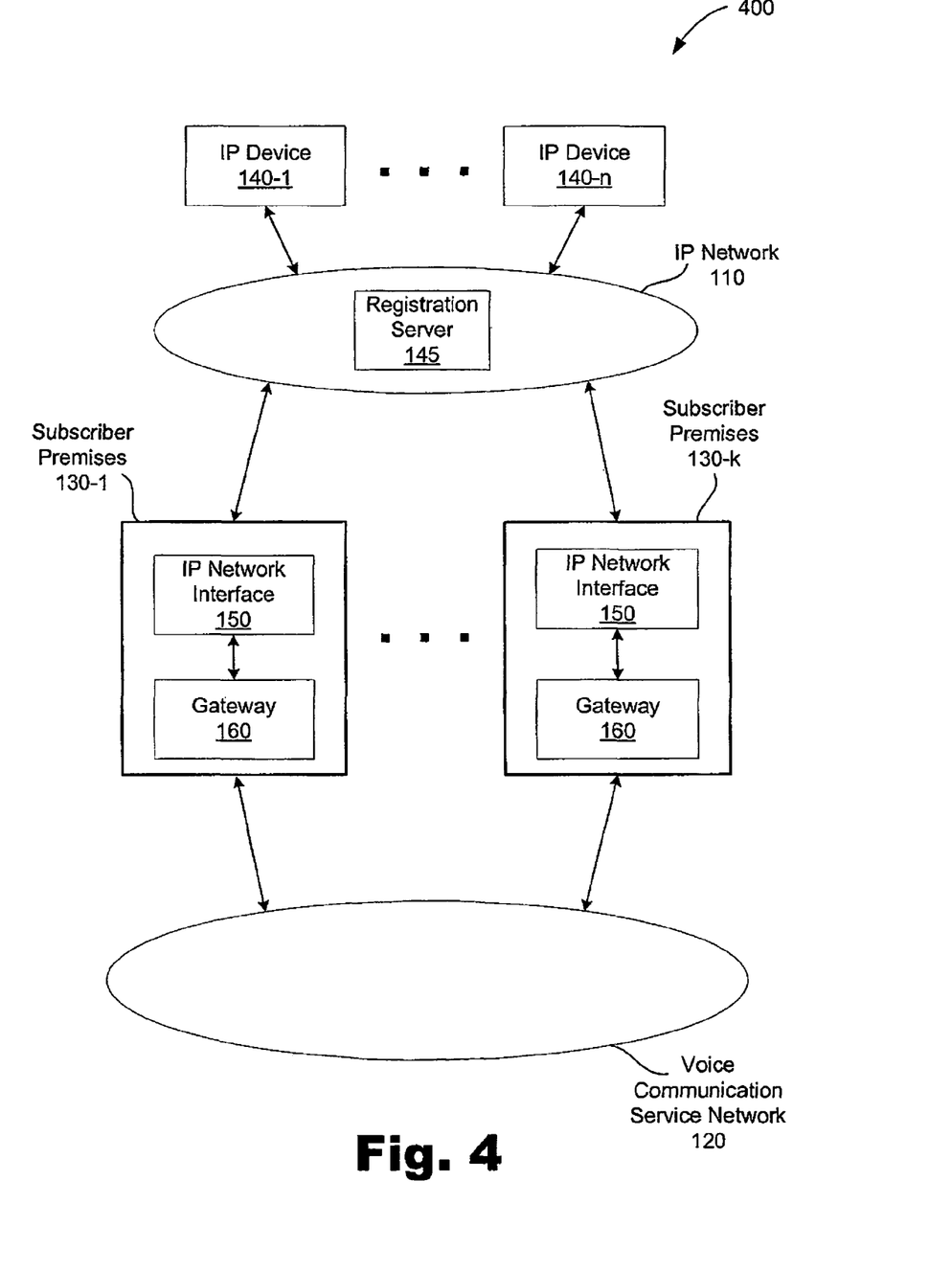
FIG. 4 is a block diagram illustrating a user group implementation of the system of FIG. 1, according to an embodiment.

As mentioned above, system 100 may be configured to support sharing of voice communication services provided at subscriber premises. Members of a user group may access the services through gateways 160 implemented at the subscriber premises associated with the members of the user group. FIG. 4 is a block diagram illustrating a user group implementation 400 of the system 100 of FIG. 1, according to an embodiment. As shown in FIG. 4, IP devices 140-1 through 140-n may be configured to communicate with registration server 145 and subscriber premises 130-1 through 130-k over IP network 110. IP devices 140-1 through 140-n may be associated with members of a user group having access to registration server 145 and/or to subscriber premises 130-1 through 130-k. Any of IP devices 140-1 through 140-n may query registration server 145 to determine information associated with subscriber premises 130-1 through 130-k, including location identifiers (e.g., area codes, zip codes, Global Positioning System ("GPS") coordinates, street addresses, cities, counties, states, provinces, countries, territories, continents, etc.) associated with subscriber premises 130-1 through 130-k and/or whether voice communication services (e.g., PSTN and VoIP telephone lines) provided at subscriber premises 130-1 through 130-k are available (e.g., during times of scheduled availability). Accordingly, a user is able to identify and select a particular one of subscriber premises 130-1 through 130-k that is near a desired location (e.g., within a local calling area) and at which a voice communication service is available.

Using information obtained from registration server 145, a particular one of IP devices 140-1 through 140-n may establish a connection with and send communications to a particular one of subscriber premises 130-1 through 130-k, which may bridge the communications in any of the ways described above, including from IP network 110 to a voice communication service available at the particular subscriber premises 130. In certain embodiments, IP device 140 may be configured with logic for determining an optimal (based on lowest cost or nearest distance, for example) subscriber premises 130 to connect to in order to bridge an IP-based voice communication to voice communication service network 120.

The implementation 400 of FIG. 4 provides users with the ability to share voice communication services with each other. For example, a user located in a first location (e.g., Italy) may establish a connection with a particular subscriber premises 130 in a second location (e.g., the USA) over IP network 110. Communications over IP network 110 may be bridged to a voice communication service available at the subscriber premises 130. Consequently, the user may place a voice communication (e.g., a PSTN or VoIP voice call) from the subscriber premises 130 using a voice communication service (e.g., a telephone line) associated with the subscriber premises 130. In this manner, the user may bridge communications to voice communication service network 120, for example, while avoiding using voice communication service network 120 for long distance communications (e.g., Italy to the USA).

V. Exemplary Process View

Figure 5:
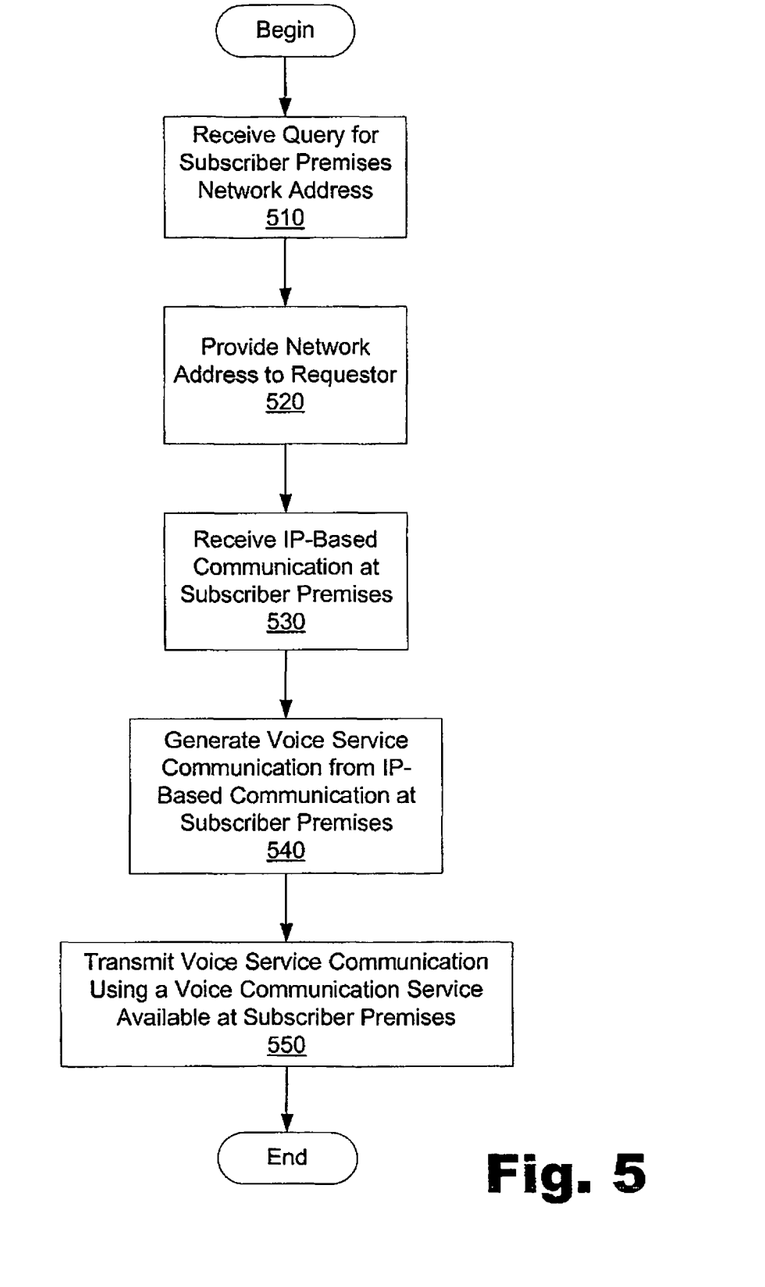
FIG. 5 is a flowchart illustrating an exemplary process for bridging a communication from an IP network to a voice communication service at a subscriber premises, according to an embodiment.

FIG. 5 illustrates an exemplary method of bridging communications (e.g., voice communications) from an IP network to a voice communication service available at a subscriber premises, according to an embodiment. While FIG. 5 illustrates exemplary steps according to one embodiment, other embodiments may omit, add to, and/or modify any of the steps shown in FIG. 5.

In step 510, a query for a network address (e.g., an IP address or an IP address and port number) associated with a subscriber premises is received at registration server 145. This step may include registration server 145 receiving a query from IP device 140 over IP network 110, as described above.

In step 520, a network address associated with the subscriber premises is provided to the requestor. Step 520 may include registration server 145 providing a network address (e.g., an IP address and optionally a port number) associated with the subscriber premises to IP device 140, as described above. In certain cases, a query may be for network addresses associated with one or more subscriber premises, and registration server 145 may return one or more network addresses to the requestor.

In step 530, an IP-based communication (e.g., a voice communication) is received at a subscriber premises (e.g., subscriber premises 130). The IP-based communication may be received over IP network 110 and may be received by IP network interface 150, as described above.

In steps 540 and 550, the IP-based communication is bridged to a voice communication service available at the subscriber premises. In step 540, a voice service communication is generated from the IP-based communication at the subscriber premises. Step 540 may be performed as described above, including gateway 160 located at the subscriber premises using any known technologies for converting IP-based communications to voice communication service communications such as PSTN communications. In step 550, the generated voice service communication is transmitted using a voice communication service available at the subscriber premises. Step 550 may be performed in any of the ways described above, including gateway 160 emulating voice communication service functionality to send voice service communications to either a voice communication service device (e.g., voice communication service device 170) over voice communication service network 120 or to a VoIP ATA (e.g., VoIP ATA 240) at the subscriber premises.

Steps 530 through 550 may be pipelined. That is, segments of communications may be streamed through steps 530 through 550, with the steps being repeated until processing of the communications has been completed.

The method illustrated in FIG. 5 provides subscribers with significant flexibility for accessing, using, and bridging between communication services (e.g., from IP-based network access services to voice communication services) available at subscriber premises. While FIG. 5 is directed to a method for bridging communications from an IP network to a voice communication service available at the subscriber premises, the method may be modified to bridge communications, at the subscriber premises, from a voice communication service to an IP network, or from the voice communication service to another voice communication service (e.g., from a PSTN service to a VoIP service). The bridging may be performed in any of the ways described above.

Figure 6:
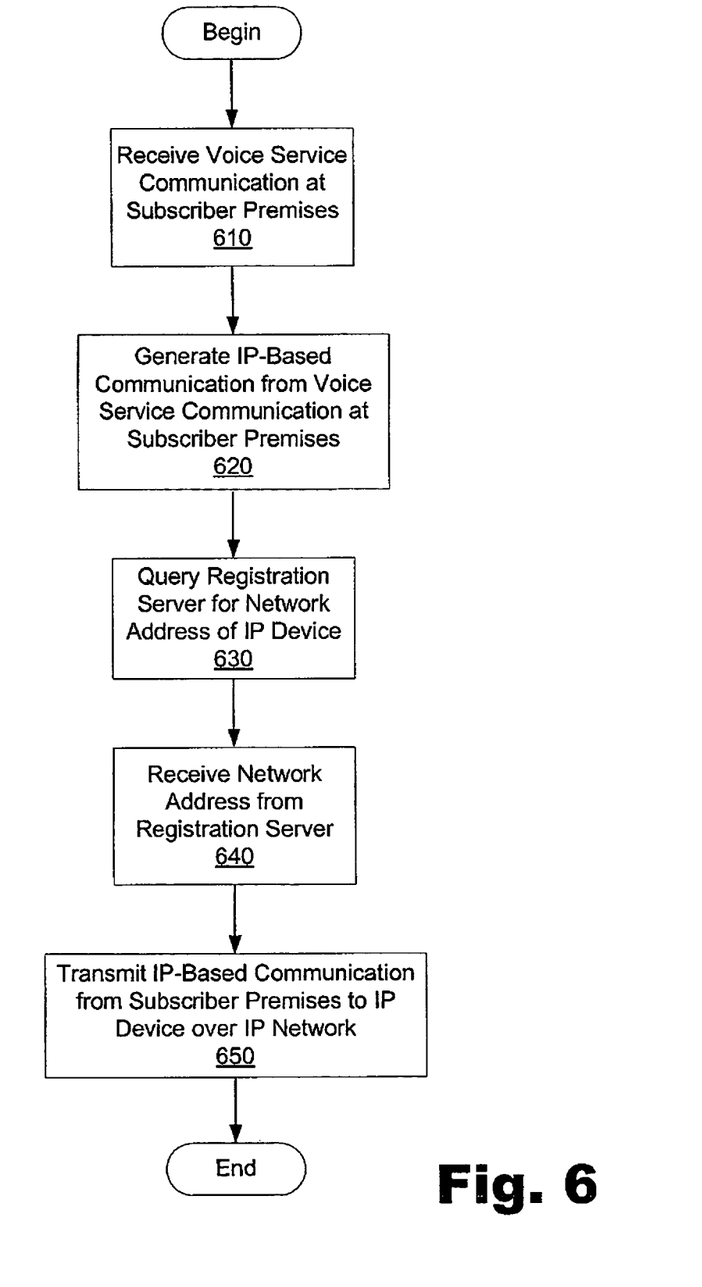
FIG. 6 is a flowchart illustrating an exemplary process for bridging a communication from a voice communication service to an IP network at a subscriber premises, according to an embodiment.

For example, FIG. 6 illustrates an exemplary process for bridging communications from a voice communication service to an IP network at a subscriber premises, according to an embodiment. While FIG. 6 illustrates exemplary steps according to one embodiment, other embodiments may omit, add to, and/or modify any of the steps shown in FIG. 6.

In step 610, a voice service communication is received at a subscriber premises (e.g., subscriber premises 130). The voice service communication may be received through a PSTN service, VoIP service, or some other voice communication service. Gateway 160 may receive the voice communication service over voice communication service network 120, including through a VoIP ATA (e.g., VoIP ATA 240) at a subscriber premises, as described above.

In step 620, an IP-based communication may be generated from the voice service communication. For example, a PSTN communication may be converted to an IP-based communication in any of the ways described above, including gateway 160 located as the subscriber premises using any known technologies for converting PSTN communications to IP-based communications. Step 620 is optional for some types of received voice service communications such as VoIP communications.

In step 630, a registration server (e.g., registration server 145) is queried for a network address associated with an IP device (e.g., IP device 140). The registration server may identify the network address in any of the ways described above. In step 640, the network address of the IP device is received from the registration server.

In step 650, the generated IP-based communication is transmitted to the IP device over an IP network (e.g., IP network 110). Step 650 may be performed in any of the ways described above, including gateway 160 transmitting IP-based signals through router 230, which transmits the signals to IP device 140 over IP network 110.

In some embodiments, steps 620-650 may be replaced by another step in order to bridge a PSTN voice service communication to a VoIP service rather than directly over IP network 110. The replacement step includes transmitting the received PSTN communication to an ATA (e.g., VoIP ATA 240) located at the subscriber premises, which can convert the PSTN signals to IP-based signals for transmission over IP network 110, as will be understood by those skilled in the art.

While FIGS. 5 and 6 refer primarily to voice communications, the methods may also be used to bridge data communications between an IP network and one or more voice communication services at a subscriber premises. Accordingly, gateway 160 at subscriber premises 130 can be used to establish a dial-up connection (i.e., modem to modem connection) to a communication service (e.g., an Internet access service) available at subscriber premises 130.

VI. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
  a plurality of gateways; and
  a registration server configured to communicate with the plurality of gateways by an IP network, each of said plurality of gateways being configured to bridge voice communications between an IP network and a voice communication service at a respective one of a plurality of subscriber premises that is remote from the registration server;

said registration server being further configured to maintain registration information including an availability of the voice communication server, that is remote from the registration server, for said plurality of gateways, the registration information further including shared usage information of user groups, wherein each of said user groups includes subscribers; and said registration server being further configured to determine information including location identifiers associated with the respective ones of the plurality of subscriber premises and select a particular one of the subscriber premises based in part on the particular one being near the local calling area and based in part on the availability of the voice communication server that is remote from the registration server, thereby causing placement of a local telephone call remote from the local calling area using the IP network to avoid a long distance telephone service.

2. The system of claim 1, wherein the voice communication service comprises at least one of a Public-Switched Telephone Network ("PSTN") service, a Voice over Internet Protocol ("VoIP") service, and a video phone service available at the subscriber premises.

3. The system of claim 2, wherein each of said gateways is configured to bridge the voice communication from the IP network to at least one of the PSTN service, the VoIP service, and the video phone service at the respective subscriber premises.

4. The system of claim 1, further comprising IP network interfaces at the subscriber premises, said IP network interfaces being communicatively coupled to respective ones of said gateways, said IP network interfaces being configured to connect said gateways to the IP network.

5. The system of claim 4, wherein each said IP network interface comprises a broadband connection at the respective subscriber premises, said broadband connection providing each respective said gateway access to the IP network and to the PSTN.

6. The system of claim 4, wherein each respective said gateway is positioned behind said respective IP network interface with respect to the IP network, each said respective IP network interface being configured with network address translation ("NAT") functionality for connecting said gateway to the IP network.

7. The system of claim 1, wherein said registration information further includes at least one of a network address and an availability status associated with said gateway.

8. The system of claim 1, wherein said registration server is further configured to provide at least a subset of said registration information in response to a query received over the IP network.

9. The system of claim 1, wherein each said gateway is configured to bridge, at the respective subscriber premises, an incoming data communication from either a Public-Switched Telephone Network ("PSTN") service or a Voice over Internet Protocol ("VoIP") service available at the respective subscriber premises, to the IP network.

10. The system of claim 1, wherein each of said plurality of gateways is configured to bridge the voice communications from the IP network to at least one of a Public-Switched Telephone Network ("PSTN") service and a Voice over Internet Protocol ("VoIP") service at the respective one of the plurality of subscriber premises.

11. The system of claim 1, wherein each of said plurality of gateways is configured to bridge the voice communications from a Public-Switched Telephone Network ("PSTN") service to at least one of the IP network and a Voice over Internet Protocol ("VoIP") service at the respective one of the plurality of subscriber premises.

12. The system of claim 1, wherein each of said plurality of gateways is configured to bridge the voice communications from a Voice over Internet Protocol ("VoIP") service to at least one of the IP network and a Public-Switched Telephone Network ("PSTN") service at the respective one of the plurality of subscriber premises.

13. The system of claim 1, wherein each of said plurality of gateways is configured to bridge the voice communications by receiving an IP-based voice communication over the IP network, generating a Public-Switched Telephone Network ("PSTN") voice communication from the IP-based voice communication, and using a PSTN service available at the respective one of said subscriber premises to transmit the PSTN voice communication over the PSTN.

14. The system of claim 13, wherein each said gateway is configured to transmit the PSTN voice communication over the PSTN to a PSTN device external of the respective subscriber premises.

15. The system of claim 1, wherein each of said plurality of gateways is configured to bridge the voice communications by receiving an IP-based voice communication over the IP network, generating a Public-Switched Telephone Network ("PSTN") voice communication from the IP-based voice communication, and transmitting the PSTN voice communication to a Voice over Internet Protocol analog telephone adaptor ("VoIP ATA") at the respective one of said plurality of subscriber premises.

16. The system of claim 1, wherein said registration server is further configured to maintain billing information for at least a first subscriber associated with said subscriber premises and shared usage information between at least the first subscriber and a second subscriber.

17. The system of claim 1, each said gateway being configured to grant access to said system in response to verification of a subscriber based on access security settings within said gateway.

18. The system of claim 1, the registration server further configured to update said registration information in response to an event within one of the subscriber premises, wherein said gateway queries of said registration server and transmit said voice communication based on said registration information.

19. The system of claim 18, wherein said event includes a status change of at least one of said gateway, said voice communications service, and said IP network.

20. The system of claim 19, wherein said status change includes at least one of turning power on, turning power off, connecting to said IP network, disconnecting from said IP network, initiating said voice communication service, and terminating said voice communication service.

21. A method, comprising:

communicating, from a registration server via an IP network, with at least one of a plurality of gateways, each of said plurality of gateways being configured to bridge voice communications between an IP network and a voice communication service at a respective one of a plurality of subscriber premises that is remote from the registration server;

maintaining, in the registration server, registration information including an availability of the voice communication server, that is remote from the registration server, for said plurality of gateways, the registration information further including shared usage information of user groups, wherein each of said user groups includes subscribers; and determining information including location identifiers associated with respective ones of the plurality of subscriber premises, and select a particular one of the subscriber premises based in part on the particular one being near the local calling area and based in part on the availability of the voice communication server that is remote from the registration server, thereby causing placement of a local telephone call remote from the local calling area using the IP network to avoid a long distance telephone service.

22. The method of claim 21, further comprising:

receiving a voice communication at the selected subscriber premises;

querying the registration server for the registration information received from an IP-PSTN gateway at the selected subscriber premises;

updating, in the registration server, the registration information received from the IP-PSTN gateway in response to an event within the selected subscriber premises; and bridging, at the subscriber premises, the voice communication between the IP network and the voice communication service available at the subscriber premises based on the registration information.

23. The method of claim 22, further comprising:

receiving the registration information associated with the IP-PSTN gateway located at the selected subscriber premises, the registration information including at least one of a network address and an availability status associated with the IP-PSTN gateway;

receiving a query for at least a subset of the registration information from an IP device; and providing the at least a subset of the registration information to the IP device.

24. The method of claim 22, wherein said event includes a status change of at least one of said gateway, said voice communications service, and said IP network.

25. The method of claim 24, wherein said status change includes at least one of turning power on, turning power off, connecting to said IP network, disconnecting from said IP network, initiating said voice communication service, and terminating said voice communication service.

26. The method of claim 21, further comprising bridging, at the subscriber premises, the voice communication between the IP network and the voice communication service available at the subscriber premises based on the registration information.

27. The method of claim 26, wherein said bridging step includes bridging the voice communication from the IP network to at least one of a Public-Switched Telephone Network ("PSTN") service and a Voice over Internet Protocol ("VoIP") service at the selected subscriber premises.

28. The method of claim 26, wherein said bridging step includes bridging the voice communication from a Public-Switched Telephone Network ("PSTN") service to at least one of the IP network and a Voice over Internet Protocol ("VoIP") service at the selected subscriber premises.

29. The method of claim 26, wherein said bridging step includes bridging the voice communication from a Voice over Internet Protocol ("VoIP") service to at least one of the IP network and a Public-Switched Telephone Network ("PSTN") service at the selected subscriber premises.

30. The method of claim 26, wherein the voice communication comprises an Internet Protocol ("IP")-based voice communication, and wherein said bridging step includes:

generating a Public-Switched Telephone Network ("PSTN") voice communication from the IP-based voice communication at the selected subscriber premises; and using a PSTN service available at the selected subscriber premises to transmit the PSTN voice communication over the PSTN.

31. The method of claim 26, wherein the voice communication comprises an Internet Protocol ("IP")-based voice communication, and wherein said bridging step includes:

generating a Public-Switched Telephone Network ("PSTN") voice communication from the IP-based voice communication at the subscriber premises; and transmitting the PSTN voice communication to a Voice over Internet Protocol analog telephone adaptor ("VoIP ATA") at the subscriber premises.

* * * * *